United States Patent
Purves et al.

(10) Patent No.: US 10,666,012 B2
(45) Date of Patent: May 26, 2020

(54) APPARATUS AND METHOD OF OPTIMIZING LASER SYSTEM

(71) Applicant: Picomole Inc., Moncton (CA)

(72) Inventors: Chris Purves, Moncton (CA);
Jean-François Bisson, Moncton (CA);
Gisia Beydaghyan, Moncton (CA)

(73) Assignee: PICOMOLE INC., Moncton (CA)

( * ) Notice: Subject to any disclaimer, the term of this patent is extended or adjusted under 35 U.S.C. 154(b) by 0 days.

(21) Appl. No.: 15/920,212

(22) Filed: Mar. 13, 2018

(65) Prior Publication Data

US 2018/0261974 A1    Sep. 13, 2018

Related U.S. Application Data

(60) Provisional application No. 62/470,544, filed on Mar. 13, 2017.

(51) Int. Cl.
| | |
|---|---|
| *H01S 3/139* | (2006.01) |
| *H01S 3/08* | (2006.01) |
| *H01S 3/137* | (2006.01) |
| *H01S 3/13* | (2006.01) |
| *H01S 3/223* | (2006.01) |

(52) U.S. Cl.
CPC ............ *H01S 3/137* (2013.01); *H01S 3/1305* (2013.01); *H01S 3/1394* (2013.01); *H01S 3/1396* (2013.01); *H01S 3/08009* (2013.01); *H01S 3/2232* (2013.01)

(58) Field of Classification Search
CPC . H01S 3/139–1398; H01S 3/105–1055; H01S 3/10069; H01S 3/08018–0805; H01S 5/0617; H01S 5/0687
See application file for complete search history.

(56) References Cited

U.S. PATENT DOCUMENTS

| | | | | |
|---|---|---|---|---|
| 3,517,330 A | * | 6/1970 | Doyle ................... | H01S 3/1396 372/32 |
| 4,468,773 A | * | 8/1984 | Seaton ................... | H01S 3/139 372/18 |
| 4,672,618 A | * | 6/1987 | Wijntjes ................ | H01S 3/1396 372/20 |

(Continued)

FOREIGN PATENT DOCUMENTS

| | | | | |
|---|---|---|---|---|
| DE | 3819687 A1 | * | 12/1989 | ............. H01S 3/137 |
| GB | 1019295 A | * | 2/1966 | ........... H01S 3/1396 |

*Primary Examiner* — Joshua King
(74) *Attorney, Agent, or Firm* — Millman IP Inc.

(57) ABSTRACT

A method and system for obtaining single-frequency operation of a laser system. A laser beam is emitted from a laser cavity, having an adjustable length, at a plurality of cavity lengths. At least a portion of the laser beam is received at a detector, which detects the presence of transverse and/or longitudinal modes in the laser beam, and generates a laser beam signal having a beat-note indicative thereof. The laser beam signal for each of the plurality of cavity lengths can be analyzed, and a cavity length of best mode purity, indicating single-frequency operation, can be selected. The laser beam system can emit a laser and have a laser beam splitter for directing at least a portion of the emitted laser beam to a laser beam detector for generating at least one laser beam signal therefrom, and an actuator for adjusting the length of the laser cavity.

8 Claims, 2 Drawing Sheets

(56) References Cited

U.S. PATENT DOCUMENTS

| | | | | |
|---|---|---|---|---|
| 4,779,279 A * | 10/1988 | Brown | H01S 3/134 | 372/20 |
| 4,964,132 A * | 10/1990 | Fischer | H01S 3/139 | 372/19 |
| 5,014,278 A * | 5/1991 | Deki | H01S 3/1396 | 372/27 |
| 5,029,174 A * | 7/1991 | Anderson | H01S 3/137 | 372/20 |
| 5,091,912 A * | 2/1992 | Bretenaker | H01S 3/1396 | 372/105 |
| 5,646,952 A * | 7/1997 | Whittley | H01S 3/115 | 372/18 |
| 6,324,191 B1 * | 11/2001 | Horvath | H01S 3/08 | 372/19 |
| 7,613,216 B2 * | 11/2009 | Nakagawa | H01S 3/1392 | 372/29.011 |
| 2004/0190563 A1 * | 9/2004 | Gendron | H01S 3/08031 | 372/10 |
| 2005/0201428 A1 * | 9/2005 | Cotteverte | H01S 3/08 | 372/26 |
| 2007/0091941 A1 * | 4/2007 | Mori | H01S 3/06754 | 372/18 |
| 2008/0170597 A1 * | 7/2008 | van der Veer | H01S 3/10092 | 372/29.011 |
| 2009/0201957 A1 * | 8/2009 | Brotherton-Ratcliffe | H01S 3/139 | 372/29.022 |
| 2010/0074089 A1 * | 3/2010 | Smith | G11B 7/0065 | 369/103 |
| 2012/0250706 A1 * | 10/2012 | Stiens | H01S 3/106 | 372/19 |
| 2016/0285236 A1 * | 9/2016 | Yvind | H01S 5/0057 | |

* cited by examiner

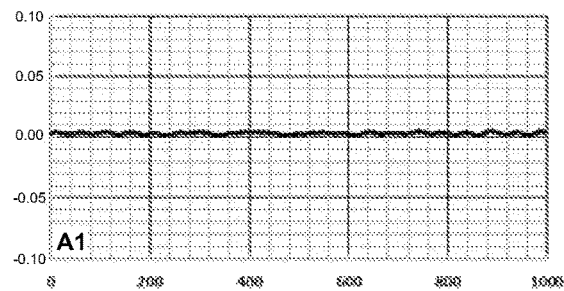
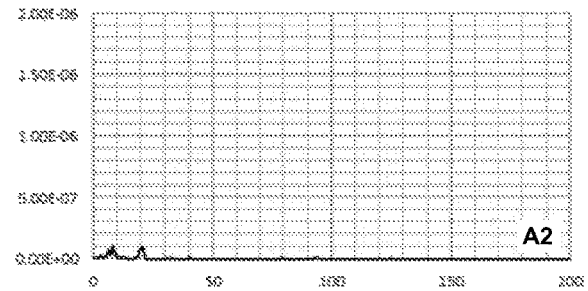
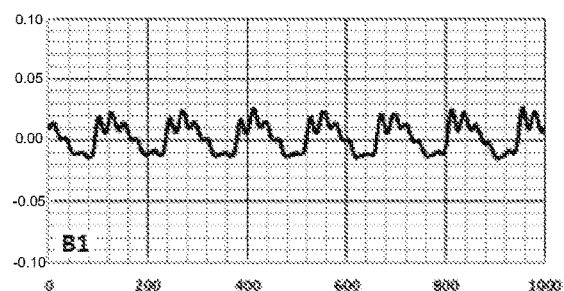
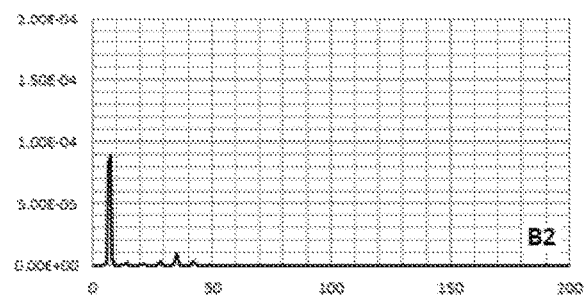
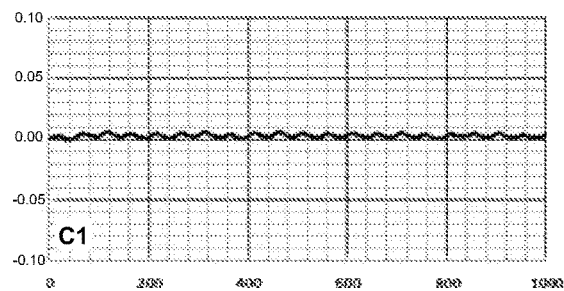
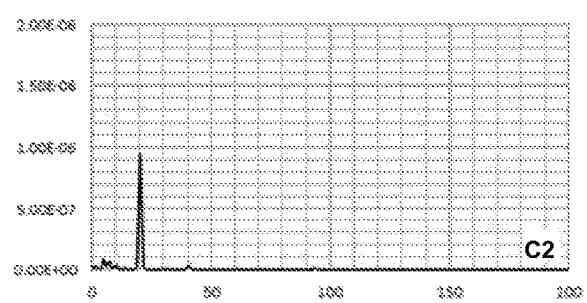
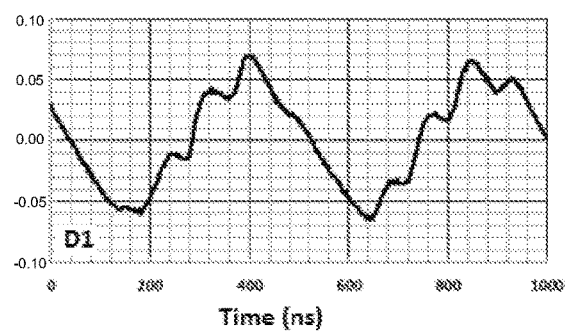
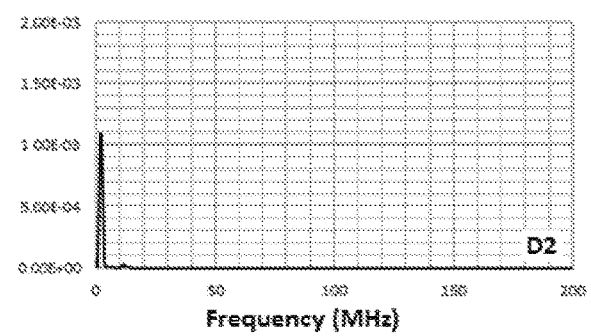
*Fig. 3A*  *Fig. 3B*

APPARATUS AND METHOD OF OPTIMIZING LASER SYSTEM

CROSS-REFERENCES

This Application claims priority to U.S. Provisional Patent Application No. 62/470,544, filed on Mar. 13, 2017.

FIELD

Embodiments herein relate to apparatus and methodologies for providing laser sources, and more particularly to methods for tuning lasers to achieve single-frequency operation.

BACKGROUND

Many laser applications, particularly those in the field of laser spectroscopy and coherent laser combining, require stable single transverse and longitudinal mode operation of a laser, which is often referred to as "single-frequency operation". In some applications, the need for single transverse mode operation is a consequence of strict requirements on beam shape, while single longitudinal mode operation is needed to avoid mode beating and provide stable continuous wave operation. Additionally, the transverse modes of a beam can have different resonance frequencies than the fundamental mode, or be phase-shifted therefrom due to Gouy phase shift, which can also result in mode beating.

Cavity Ring-Down Spectroscopy (CRDS), a powerful method for measuring concentrations of trace constituents in a gas mixture, for example the trace chemicals present in human breath, is an example of an application requiring single-frequency operation. The CRDS technique requires a laser source capable of emitting a pulsed or continuous wave and sequentially producing numerous lines with narrow linewidth, and a laser cavity/resonator with highly reflective mirrors to enable decay time measurements of each laser line inside the cavity. The gas mixture to be analyzed is then introduced into the cavity and the decay time of the laser lines can be measured and compared against the known decay time for an empty cavity. The analysis of decay times enables the identification and quantification of constituents in the gas mixture.

The CRDS technique works best with a tunable single-frequency laser source with a narrow linewidth. One method of resonance line selection is utilizing a rotatable intra-cavity diffraction grating that selects one spectral region that is fed back into the resonator, which in turn outputs a laser beam of the selected frequency spectrum. The output beam may be a single lowest-order mode emission, or some mode mixing may take place. Frequently, the extra modes are transverse modes which are excited and have not been excluded due to the line selection method, such as the diffraction grating, not being sufficiently fine-tuned for excluding them.

Existing methods for obtaining single-frequency operation such as Master Oscillator Power Amplifiers (MOPA) or injection-locked lasers are complex, expensive, and difficult to use. Methods requiring intra-cavity elements to filter out higher-order modes, such as using a hard aperture, result in loss of power of the resultant beam and are not suitable for a broad wavelength range. Single-mode fibers provide another means for achieving single-mode operation. However, their availability is severely limited for some wavelengths, for example, in the mid infra-red range.

Methods such as that disclosed in U.S. Pat. No. 6,324,191 (the '191 Patent), aimed for ophthalmic surgery, teach a means to achieve single transverse mode operation of a passively mode-locked Nd3+-doped glass laser. In the '191 Patent, single-frequency operation is obtained by detecting a beat-note in the emitted laser beam to determine the co-existence of modes therein, and advancing a straight edge towards the center of the beam until beat-note frequencies are no longer detected, thus indicating the successful suppression of higher-order transverse modes. The mode suppression method taught in the '191 Patent is based on preferential losses between transverse modes, and therefore makes the output power smaller, which is an undesirable effect. Further, the said method is intrinsically multi-frequency, and does not provide true single-frequency operation, as the use of a straight edge to suppress transverse modes cannot completely isolate the fundamental mode, due to the close spacing of the fundamental and transverse modes.

There is a need for a method and apparatus that provides true single-frequency operation in an economical, easy-to-use manner, and with a minimal loss of output power.

SUMMARY

According to the present apparatus and methodologies, a system for tuning the parameters of a laser beam are provided, the system operative to produce and maintain single-frequency operation of the laser beam. Herein, the present apparatus and methodologies enable adjustment of the length of the laser beam cavity of the laser system by detecting a beat-note of the emitted laser beam and/or by calculating a mode purity value therefrom. Adjusting the length of the present laser cavity enables tuning of the present system such that overlap of gain bandwidth of a gain medium with a specific lowest-order mode of the laser cavity is optimized in order to obtain pure lowest order transverse and longitudinal mode operation. In some embodiments, tuning of the present system (i.e. adjustment of the cavity length) may be occur in real-time to maintain single-frequency operation of the system.

In some embodiments, the methods comprise providing a laser for emitting a laser beam within the cavity, wherein the length of the cavity may be adjusted to one of a plurality of cavity lengths; emitting the laser beam at each one of the plurality of cavity lengths; providing a detector, operably coupled to a computer, for: receiving at least a portion of the laser beam emitted at each one of the plurality of cavity lengths; detecting the presence of transverse modes, longitudinal modes, or both, in the received laser beam emitted at each one of the plurality of cavity lengths and when at least transverse modes, longitudinal modes, or both, are detected, generating at least one laser beam signal having a beat-note indicative thereof; and selecting, based upon the generated at least one laser beam signals, at least one cavity lengths for eliminating the beat-note and producing single-frequency operation of the laser beam; and adjusting the length of the cavity one of the one or more selected cavity lengths.

Detecting the presence of transverse modes, longitudinal modes, or both, comprises detecting a frequency difference of the transverse modes, the longitudinal modes, or both, wherein the frequency difference comprises the difference between the transverse modes, longitudinal modes, or both, across approximately one free spectral range within the cavity.

In other embodiments, the method further comprises calculating a mode purity value by combining a detected amplitude of the beat-note in the generated laser beam signal (AC portion) with a detected intensity of the generated laser beam signal (DC portion), and adjusting the length of the cavity to the highest mode purity value.

In yet other embodiments, the present system comprises a laser for emitting a laser beam, the laser beam emitted in a laser cavity having a first end and a second end, and having a length, the cavity comprising at least, a diffraction grating, positioned at the first end of the cavity, for providing a mirror within the cavity, an output coupler, positioned at the second end of the cavity, wherein the distance between the diffraction grating and the output coupler defines the length of the cavity, and a gain medium, positioned between the diffraction grating and the output coupler, a laser beam splitter for receiving and dividing the emitted laser beam and for directing at least a portion of the divided laser beam to a laser beam detector, a laser beam detector, for receiving and detecting the directed portion of the emitted laser beam from the laser beam splitter, and for generating at least one signal indicative thereof, an actuator, for actuating at least the diffraction grating, the output coupler, or both, to adjust the length of the cavity to produce a single-frequency operation of the laser.

BRIEF DESCRIPTION OF THE DRAWINGS

FIG. 3A is a series of graphs showing the time-domain waveforms of the laser beam when the output coupler is in positions A, B, C, and D, as indicated in FIG. 2; and FIG. 3B is a series of graphs showing the frequency-domain waveforms of the laser beam when the output coupler is in positions A, B, C, and D.

DESCRIPTION

According to embodiments herein, apparatus and methodologies for tuning the parameters of a laser system are provided, such tuning operative to provide or produce single-frequency operation of a laser beam generated by the system, and to maintain such single-frequency while the laser system is in use. As will be described in more detail, the present apparatus and methodologies can adjust the length of the laser beam cavity of the laser system by detecting a beat-note of the emitted laser beam and by calculating a mode purity value therefrom. Adjusting the length of the present laser cavity enables tuning of the present system such that overlap of gain bandwidth of a gain medium with a specific lowest-order mode of the laser cavity is optimized in order to obtain pure lowest order transverse and longitudinal mode operation. The present apparatus and methodologies will now be described having regard to FIGS. 1-3.

Figure 1:
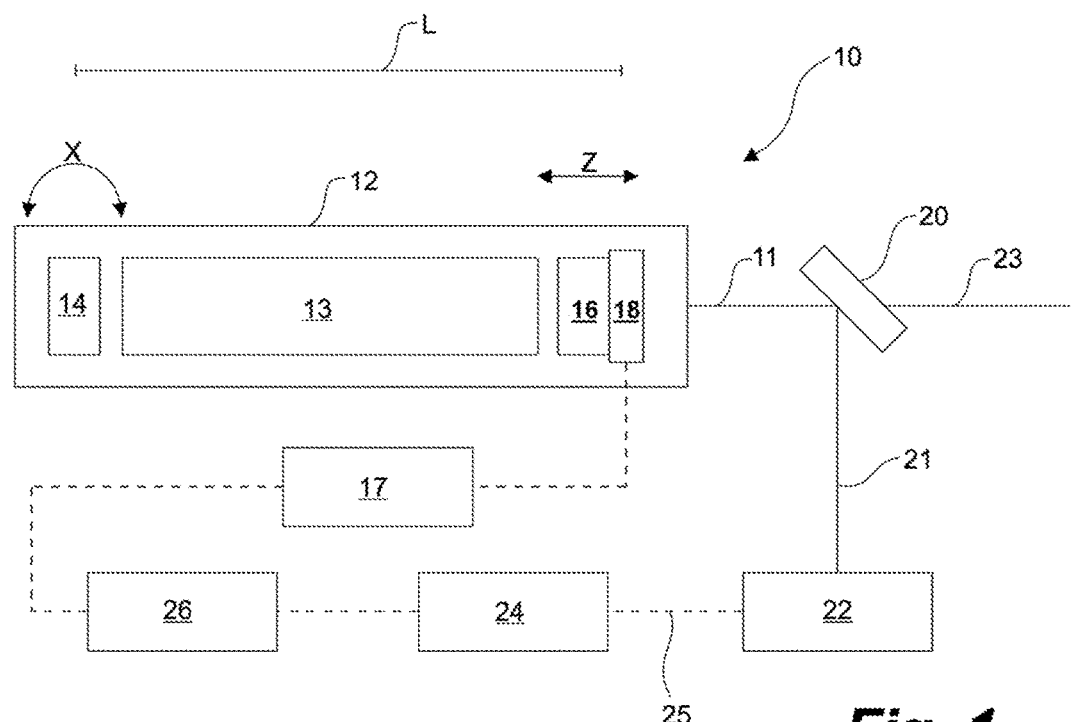
FIG. 1 is a schematic representation of an embodiment of a laser system for obtaining single-frequency operation.

Having regard to FIG. 1, the present apparatus and methodologies comprise a laser system 10 configured to emit a laser beam 11 for use in applications such as Cavity Ring-Down Spectroscopy. For example, laser system 10 may comprise, but is not limited to, a $CO_2$ gas laser that can be tuned at several wavelengths. Laser system 10 may comprise a laser beam cavity/resonator 12, said cavity 12 having a length L. As will be described, it is an advantage of the present system 10 that the length L of cavity 12 can be adjusted in order to obtain pure lowest-order transverse mode operation, denoted herein as $TEM_{00}$.

In some embodiments, the present laser beam cavity 12 comprises a diffraction grating 14, positioned at a first (rear) end of the cavity 12, serving as the rear mirror of the cavity 12, and an output coupler 16, positioned at a second opposite end of the cavity 12. The distance between diffraction grating 14 and output coupler 16 defines the length L of the cavity 12. Laser cavity 12 further comprises a gain medium 13, positioned between diffraction grating 14 and output coupler 16, serving to amplify energy from a laser pump (not shown) to generate the output laser beam 11.

The present laser cavity 12 may be operably coupled to a laser beam splitter 20 for splitting (i.e. dividing) laser beam 11 into a first test beam 21 for use according to embodiments herein (i.e. for detection by a laser beam detector), and a second main beam 23 for use in applications such as CRDS. Laser cavity 12 may be further operably coupled to a laser beam detector 22 (e.g. a fast photodetector) for detecting first beam 21 from splitter 20 and for measuring the power/intensity and frequency thereof (as described in more detail below). In some embodiments, detector 22 may comprise a bandwidth that exceeds a pre-determined or expected beat-note signal frequency for beam 21. For example, it should be understood that, for $CO_2$ lasers emitting at specific frequencies, the highest expected beat frequency would be the difference in the frequency between two adjacent emissions frequencies. As such, it is contemplated that a suitable detector 22 may comprise a bandwidth in the order of the free spectral range (FSR) of the laser cavity/resonator 12 (e.g. 1 GHz). Preferably, in practice, in the case of free-space resonators where the modes are orthogonal, detector 22 may have a small surface area, or clip the beam 21, as full spatial integration of the beam 21 could result in vanishing of the overlap integral due to orthogonality of modes, thus eliminating the beat-note signal generated by the mixing of the modes. In response to the first beam 21 being detected, detector 22 may generate a detected signal 25 therefrom (represented by dashed lines), wherein the signal 25 may be digitized by a digitizer 24 (such as an acquisition card) and analyzed by a computer 26. As below, the present system, in whole or in part, may be operably coupled to computer 26, such that the entire system or components thereof may be automated.

The present system will now be described in operation having regard to the Examples provided below.

Generally, the present apparatus and methodologies serve to adjust the length L of cavity 12 as a means for tuning the present system to obtain the lowest-order transverse and longitudinal mode of operation. Herein, diffraction grating 14 can be rotatable about an axis x, enabling a particular frequency of laser beam 11 to be selected through resonance with output coupler 16. The particular frequency could be a mixture of frequencies (e.g. close in range but not identical) comprising the fundamental mode $TEM_{00p}$ and various higher-order transverse modes $TEM_{mnp}$. The existence of transverse and/or longitudinal modes in the beam 11/21 will result in a beat-note in the detected signal 25 generated therefrom. Where a beat-note may be present, the length L of the cavity 12 can be adjusted to eliminate said beat-note so as to achieve single-frequency operation (i.e. to maximize a mode purity value calculated from the laser beam 21 being detected). Moreover, the detected laser beam signal 25 can also be used to dynamically tune the laser beam 11 in real-time, thereby counteracting frequency shifts due to temperature variation and/or vibration and maintain single-frequency operation.

It should be understood that the length L of cavity 12 can be adjusted by moving output coupler 16 substantially longitudinally along the axis z, such movement imparted on the coupler 16 by any means known in the art. For example, an actuator 18, such as a piezoelectric actuator controlled by a piezo driver 17, may be provided to translate coupler 16 along axis z (increasing or decreasing length L). According to other embodiments, diffraction grating 14 may be moved longitudinally along axis z to adjust length L of cavity 12, although it should be appreciated that adjusting grating 14 both rotatably and longitudinally could add a degree of complexity to the system 10.

It should further be understood that the ability to adjust the length L of cavity 12 by at least one free spectral range (FSR) of the cavity 12 enables the tuning of the present system 10 to obtain pure lowest-order transverse and longitudinal mode operation. As will be described, an optimal cavity length L can be determined by detecting a beat-note of emitted laser beam 11, and calculating a mode purity value therefrom, for various cavity lengths L over one FSR of the cavity 12. In some embodiments, the cavity length L providing minimal beat-note and a greatest mode purity value can be selected in order to optimize single-frequency operation of the system 10.

Beat-Note Signal Detection and Processing

As above, the existence of a beat-note in the detected signal 25 generated in response to at least a portion of laser beam 11 is a result of the frequency difference of the constituent modes of the beam, in particular the frequency difference between transverse modes $TEM_{mnp}$ within the same FSR of the cavity/resonator 12. For example, in a cavity 12 with two identical spherical mirrors, the resonance frequencies $\upsilon_{mnp}$ of the cavity 12 are given by:

$$\frac{2\pi L}{c} \upsilon_{mnp} - (m + n + 1)(\psi(z_2) - \psi(z_1)) = p\pi$$

where $L = z_2 - z_1$ is the length of the cavity 12, $\psi(z) = \arctan(z/z_r)$ is the Gouy phase shift, $z_r$ is the Rayleigh length of the resultant beam 11, and (m, n) are the transverse mode indices and p is the longitudinal mode index. When a transverse mode $TEM_{mnp}$ is present in the at least one portion of the beam 11 together with the fundamental mode $TEM_{00p}$, a beat-note signal can arise in the output intensity of the beam 11 due to coherent combining of the two modes. Additional transverse modes combine in the same manner and contribute to the beat-note signal. Where detector 22 comprises a sufficiently fast response time, i.e. a bandwidth greater than the maximum expected frequency of the beat-note signal, the presence of a beat-note can be detected and used to determine the position of single-frequency operation.

In some circumstances, analyzing the beat-note of the detected signal 25 alone may not provide the position of the single-frequency operation. For example, where accidental degeneracies exist for the resonance frequencies of several modes, the beat-note of the detected signal 25 may be nonexistent, but the competition between the multiple modes lowers the output power. In such cases, amplitude of the beat-note (AC component) of the detected signal 25 can be combined with the overall intensity (DC component) of the signal 25 to optimize cavity length L to provide purest mode operation. Typically, the DC portion of the detected signal 25 is indicative of the beam power and/or intensity, whereas the AC portion, i.e. the beat-note, is indicative of the degree of mode mixing. The relative strength of the AC portion can be determined by a variety of means which include, but are not limited to, peak-to-peak voltage, variance or standard deviation of the signal. Since $TEM_{00p}$ has a stronger signal (i.e. greater intensity) relative to higher order transverse modes $TEM_{mnp}$ due to better overlap with the bandwidth of the gain medium 13, and is often the desired mode, the cavity length L of highest mode purity can be identified by finding the length L of highest overall intensity and lowest beat-note amplitude.

To obtain a more straightforward representation of mode purity, the AC component can be normalized to the DC component to quantify a mode purity value of the emitted beam, as described in further detail below.

Mode Purity Value

A mode purity of laser beam 11 is inversely correlated with the number of longitudinal and transverse modes that exist in the first beam 21, and can be quantified by determining a mode purity value obtained from the AC and DC portions of the detected signal 25 generated in response to said beam 21. More specifically, a mode purity value can be determined by the ratio R of the overall signal (the DC component) with respect to the strength of the detected beat signal (the AC component). Various definitions can be used for the AC and DC components of the beat signal. For example, the ratio R can be one of the following:

$$R = \frac{V_{ave}}{V_{pp}}$$

where $V_{ave}$ is the average voltage and $V_{pp}$ is peak-to-peak voltage;

$$R = \frac{V_{ave}}{V_{RMS}}$$

where $V_{ave}$ is the average voltage and $V_{RMS}$ is the root mean square of the voltage; or $$R = \frac{V_{ave}}{V_{\sigma}}$$

where $V_{ave}$ is the average voltage and $V_{\sigma}$ is the standard deviation of the voltage.

As one of skill in the art would understand, the above ratios are for exemplary purposes only, and other parameters could be used to produce a suitable mode purity value.

The above formulae demonstrate that the position corresponding with the highest mode purity value is the position where the AC portion of the detected signal 25 is weakest and the DC portion is strongest. Accordingly, a true single-frequency operation of the present system 10 can be obtained by scanning the emitted beam 21 by detector 22 through all of the cavity lengths L/output coupler 16 positions over at least one FSR of the cavity 12, calculating a mode purity value for each position using the formulae above, and selecting the cavity length L corresponding to the highest mode purity value.

Alternatively, the presence of the beat-note frequencies can also be detected by frequency-domain analysis of the detected signal 25, such as by taking the Fourier transform of the detected signal 25. The output coupler position/cavity length L corresponding to highest mode purity can be identified by the lowest frequency domain signal.

In embodiments, a normalized AC signal, or a representation thereof, could be used as an error signal to indicate mode mixing, which is fed back to the computer 26. The computer 26 may then be operable to activate actuator 18 to translate output coupler 16, adjusting the length L, to reduce the error signal until a threshold value is achieved, said threshold value being selected as being indicative that single-frequency operation of the system 10 has been achieved.

Example Use of Method

1e;.5qIn operation, apparatus and methods for producing single-frequency operation of the present example laser system 10 are provided. Initially, output coupler 16 may be cycled through each of its positions across at least one FSR of the cavity/resonator 12 such that detector 22 generates a detected signal 25 from the first beam 21 at each of the said positions. The detected signal 25 is then digitized by digitizer 24 and fed into computer 26, which calculates a mode purity value for each coupler position/cavity length L using the method described above, and adjusts the position of output coupler 16 to the position corresponding with the highest mode purity value.

Figure 2:
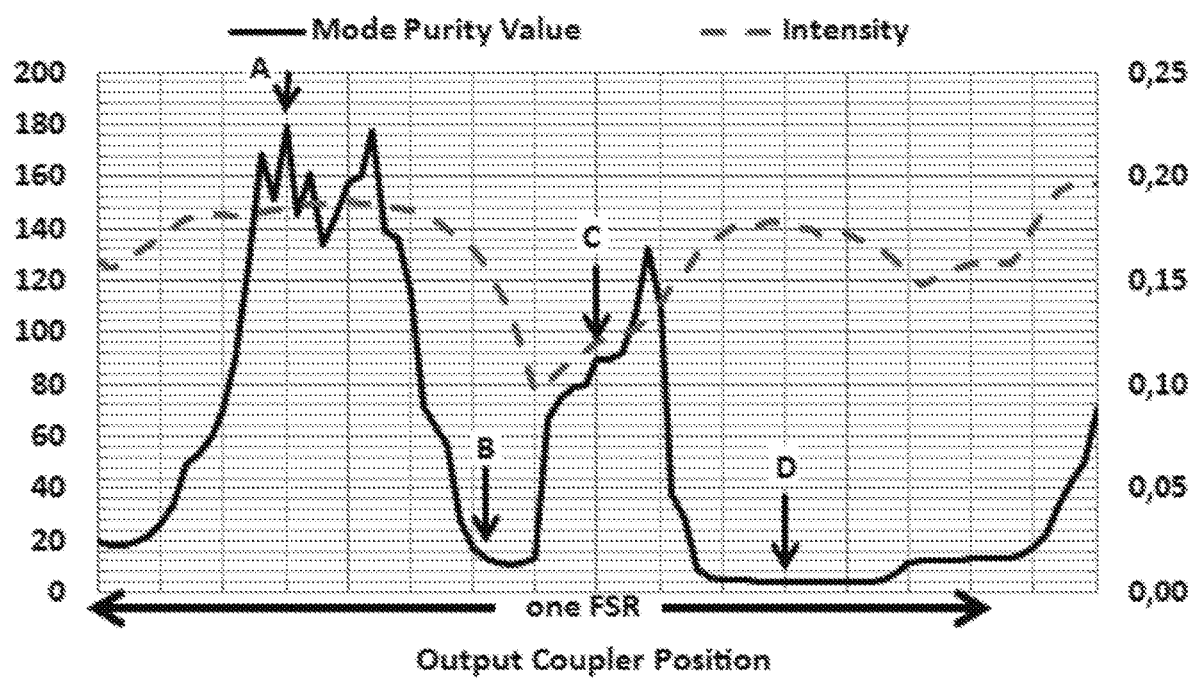
FIG. 2 is a graph depicting the intensity and mode purity value of the laser beam of the system of FIG. 1, measured as a function of the position of the output coupler of the system i.e. cavity length.

FIG. 2 depicts the mode purity value R (left-hand scale) and total intensity (right-hand scale) of the laser beam 11 generated by the system 10 with respect to position of the output coupler 16. The positions A, B, C, and D marked on the graph correspond to different output coupler positions/cavity lengths L over one FSR of the cavity 12, with arrow A indicating the position of highest mode purity. FIG. 3A shows the beat patterns of a detected signal 25 generated by detector 22 in response to the first beam 21 from the laser system 10. The various beat patterns A1, B1, C1, D1 of FIG. 3A correspond to positions A, B, C, D of the output coupler 16, respectively.

In this case, the mode purity value R for an output coupler 16 position/cavity length L is given by the average signal, shown as intensity in FIG. 2, divided by the peak-to-peak voltage of the signal, as shown in FIG. 3A. For example, for position A, the peak-to-peak voltage $V_{ppA}$ from FIG. 3A is about 0.001V, and the intensity or average signal $V_{aveA}$ is 0.18V. Therefore, the mode purity value RA for position A is 0.18V/0.001V=180. For position C, $V_{ppC}$ is about 0.0014V and the intensity $V_{aveC}$ is 0.12V. Therefore, the mode purity value $R_C$ for position C is 0.12V/0.0014V=85. It can be seen from FIGS. 2 and 3A that for positions A and C, having the highest mode purity values, the power contribution of all measured frequencies is low in the time-domain. On the other hand, several frequencies, including a very prominent one, are present in the time-domain signals of positions B and D, indicating a high AC component in the detected signal 25 and therefore a low value of mode purity.

As mentioned above, a Fourier transform of the detected signal 25 can also be used to determine the position of highest mode purity. FIG. 3B shows the corresponding fast Fourier transforms A2, B2, C2, D2 of the detected signals shown in A1, B1, C1, and D1, with the X-axis corresponding to the frequency or frequencies of the beat-note and the y-axis corresponding to intensity of the beat-note. For example, prominent beat frequencies of relatively higher intensity are shown for B2 and D2, indicating lower mode purity, while a lower intensity beat frequency is shown for C2, indicating higher mode purity. Almost no beat frequencies are detected for A2, which indicates highest mode purity. Typically, the exact beat frequencies are not important in Fourier analysis of the detected signals, as one is simply looking for the presence and intensity of detected beat frequencies.

In embodiments, once the optimal mode purity, and thus single-frequency operation, has been achieved by the previously described method, the laser system 10 can be dynamically adjusted to maintain single-frequency operation even when there are fluctuations due to temperature, vibrations, etc. by monitoring the first beam 21, calculating the mode purity in real-time, and adjusting the position of the output coupler 16 to maintain maximum mode purity during operation of the laser.

We claim:

1. A method for producing single-frequency or near-single-frequency operation of a laser beam generated by a laser beam system, comprising:
   providing a laser for emitting a laser beam within a laser beam cavity, the cavity having a length, wherein the length of the cavity may be adjusted to one of a plurality of cavity lengths;
   emitting the laser beam at each one of the plurality of cavity lengths;
   providing a detector for, for each of the plurality of cavity lengths, receiving at least a portion of the laser beam emitted, and generating a signal;
   identifying, via a computer operably coupled to the detector, at least one beat note in the signal for each of at least one of the plurality of cavity lengths, each of the at least one beat note comprising an oscillation in a detected intensity of the signal, the oscillation having a measured amplitude and a measured frequency, the at least one beat note indicating the presence of one or more higher-order transverse modes, longitudinal modes, or both, in the received at least the portion of the laser beam emitted at the at least one of the plurality of cavity lengths;
   selecting, based upon the generated signal for each of the plurality of cavity lengths, at least one of the plurality of cavity lengths for eliminating or minimizing the at least one beat note; and
   adjusting the length of the cavity to one of the selected at least one of the plurality of cavity lengths.

2. The method of claim 1, wherein the frequency of the at least one beat note comprises a frequency difference of the higher-order transverse modes, longitudinal modes, or both.

3. The method of claim 2, wherein the frequency difference comprises the difference between transverse modes across approximately one free spectral range within the cavity.

4. The method of claim 3, wherein the frequency difference $\upsilon_{mnp}$ is determined using the formula:

$$\frac{2\pi L}{c} \upsilon_{mnp} - (m+n+1)(\psi(z_2) - \psi(z_1)) = p\pi,$$

where
$L = z_2 - z_1$ is the length of the cavity,
$\psi(z) = \arctan(z/z_r)$ is the Gouy phase shift,
$z_r$ is the Rayleigh length of the emitted laser beam,
(m, n) are the transverse mode indices, and
p is the longitudinal mode index.

5. The method of claim 1, wherein the method further comprises calculating a mode purity value for each of the plurality of cavity lengths by combining the detected amplitude of the at least one beat note in the generated signal with the detected average intensity of the generated signal, and adjusting the length of the cavity to one of the plurality of cavity lengths having the highest mode purity value.

6. The method of claim 5, wherein calculating the mode purity value comprises determining a ratio R of the detected average intensity of the generated signal with respect to the detected amplitude of the at least one beat note in the generated signal defined as one of:

$$R = \frac{V_{ave}}{V_{pp}}$$

where $V_{ave}$ is the average voltage and $V_{pp}$ is peak-to-peak voltage;

$$R = \frac{V_{ave}}{V_{RMS}}$$

where $V_{ave}$ is the average voltage and $V_{RMS}$ is the root mean square of the voltage; or $$R = \frac{V_{ave}}{V_{\sigma}}$$

where $V_{ave}$ is the average voltage and $V_{\sigma}$ is the standard deviation of the voltage.

7. The method of claim 5, wherein the highest mode purity value corresponds to the at least one of the plurality of cavity lengths.

8. The method of claim 1, wherein the adjusting the length of the cavity to one of the selected at least one cavity length is performed in real-time to maintain single-frequency or near-single-frequency operation of the laser.

* * * * *